June 13, 1933.  E. S. WAGNER  1,914,056
SAFETY SWITCH CONTROL
Filed March 23, 1931   2 Sheets-Sheet 1
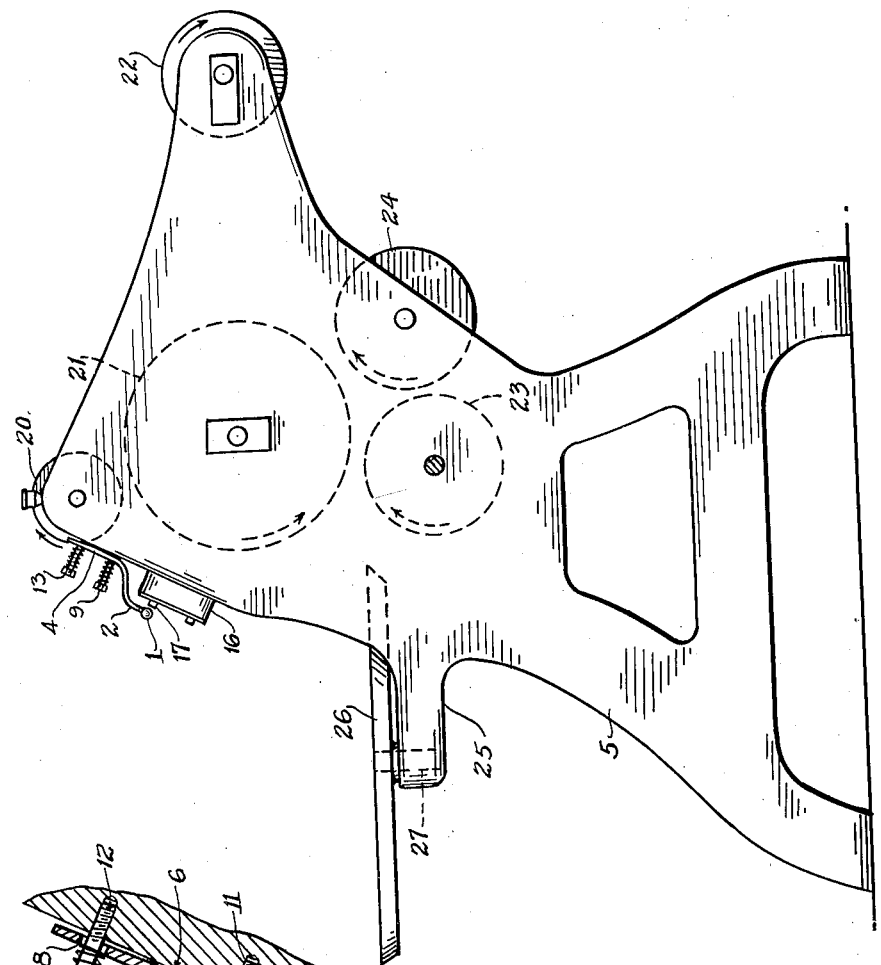
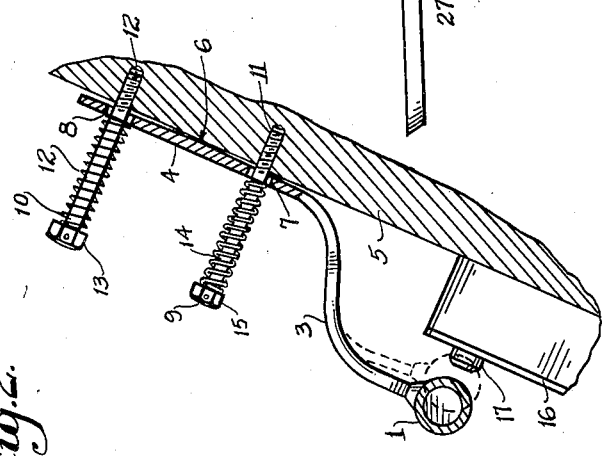
Inventor
Edwin S. Wagner
By Mason Fenwick & Lawrence
Attorneys June 13, 1933.   E. S. WAGNER   1,914,056
SAFETY SWITCH CONTROL
Filed March 23, 1931   2 Sheets-Sheet 2

Inventor
Edwin S. Wagner
By Mason Fenwick & Lawrence
Attorneys

Patented June 13, 1933

1,914,056

UNITED STATES PATENT OFFICE

EDWIN S. WAGNER, OF HERSHEY, PENNSYLVANIA

SAFETY SWITCH CONTROL

Application filed March 23, 1931. Serial No. 524,697.

The present invention is a safety attachment designed to be secured particularly to dough breaking machines to enable the operator thereof to stop the machine when both hands are occupied or are in such position that they are in danger of being caught by the breaking rolls of the said machine.

The main object of the invention is to provide an attachment of this character which can be very readily attached to the framework of any machine and adjacent the stop mechanism thereof in order to actuate such mechanism by any part of the body of the operator whenever the position of the operator is such as to endanger any part of his body by becoming caught by any part of the machine.

Other objects of the invention will become apparent as the detailed description thereof proceeds:

In the drawings:

Figure 1 is a side elevation of a dough breaking machine having the attachment forming this invention mounted in suitable position for operation by the body of the operator;

Figure 2 is a fragmentary sectional elevation of the attachment, the scale being enlarged;

Figure 4:
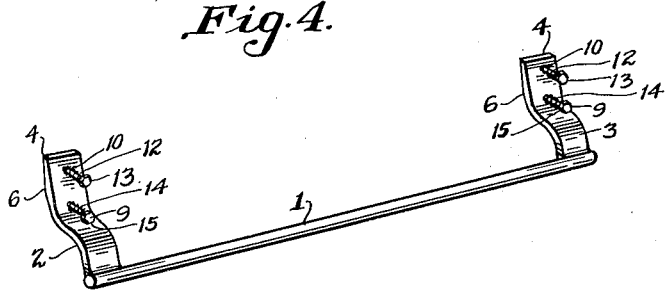
Figure 4 is a perspective view of the attachment disconnected from the frame-work.

As shown in the drawings, the invention comprises a bar 1 having a pair of lugs 2 and 3 suitably connected to the opposite ends thereof. Each of these lugs is bent, as shown in Figure 2, in order to provide a flat fulcrum plate 4 by means of which the bar is pivotally mounted on the frame-work 5 of the dough breaking machine. As shown particularly in Figure 4, the fulcrum plate 4 of each lug 2 and 3 is made thicker at the center thereof to form a fulcrum point 6, which serves as a point about which the lugs 2 and 3 and the bar 1 is adapted to rock.

In order to secure the fulcrum plate 4 to the frame-work 5, the plate 4 is provided with a pair of apertures 7 and 8 equidistantly spaced from the fulcrum point 6. Each of these apertures is formed to permit the passage there-through of bolts 9 and 10, the screw-threaded ends of which engage the correspondingly threaded bores 11 and 12 respectively, formed in the frame-work in suitable position to receive said bolts.

Each of the upper bolts 10 has a compression spring 12 arranged between the fulcrum plate 4 and the head 13 of the bolt. Similarly each of the bolts 9 has a compression spring 14 arranged between the fulcrum plate 4 and the head 15 of the bolt 9.

Figure 3:
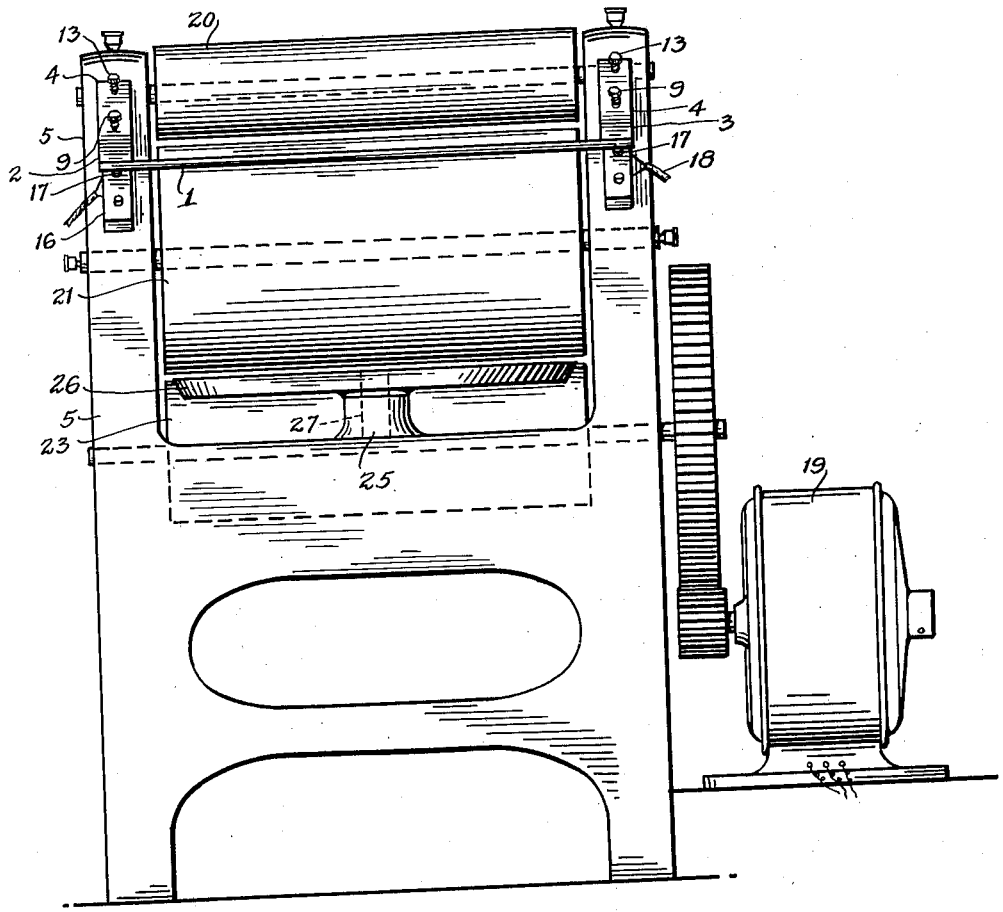
Figure 3 is a front elevation of a dough breaking machine with the attachment secured to the frame-work thereof.

As shown in Figure 3 of the drawings, a switch box 16 is mounted on each side of the framework 5. Each of these boxes 16 includes a motor starting button 16' and a stop button 17. Wiring 18 connects the switch mechanism (not shown) in the box 16 to the motor 19. The motor may be started by pressing either or both buttons 16'. The bar 1 is designed and mounted to contact with both stop buttons 17 simultaneously. It is therefore immaterial which of the buttons 16' be used to start the motor since the bar 1 will, when depressed, break any closed motor circuit or circuits through either or both boxes.

The attachment is shown as connected to control the operation of a machine having rollers 20, 21, 22, 23 and 24 rotatably mounted in the frame-work 5 in the usual manner of machines of this type. The frame-work is provided with a horizontally extending bracket 25 on which a turn table 26 is mounted to rotate about a vertical axis 27.

In the ordinary operation of machines of this type a batch of dough is broken up by repeatedly sending the dough through rolls and belts, the dough always returning to a turn-table at the point from which it started. This turn-table, 26 as shown in the drawings, is used by the operator, after the return of a batch of dough to said turn table, to turn the bath at right angles in order to give the batch a half turn before passing it again through the rolls of the machine.

The operator picks up a batch of dough with both hands and advances same towards the machine in order to start the dough between the rolls 21 and 23. In some cases the rolls grab the dough so rapidly as to draw the operator toward the machine and sometimes pull him off balance. In his efforts to disentangle his hands from the batch of dough, one or both hands or even arms may be caught and crushed before the machine can be stopped; that is, in machines that are not equipped with safety devices of the character disclosed herein.

In machines of this type provided with an attachment of the character disclosed herein the operator in being drawn, or falling, toward the machine must inevitably make contact with the bar 1 and depress it to operate the stop switch 17 and thereby stop the machine.

The springs 12 on the bolts 10 are lighter than the springs 14 on the bolts 9, and serve only as a balance or as a means for adjusting the plates or lugs 4 to such position as to require only a slight pressure or bump against the bar 1 to move it against the stop switch 17. The springs 14 are purposely made heavy in order to withstand the impacts against the bar 1 of the returning dough, which occasionally doubles up at the point of emergence between the rollers 20 and 21.

The reason for the peculiar construction of the fulcrum plates 4 is now apparent. If these plates were hinged by the usual pivot hinges to the frame-work 5 at the fulcrum points 6, the pressure of the returning dough against the bar 1 might cause a further bending of the lugs 2 and 3 and might even cause a breakage thereof. It is clear from Figure 2 of the drawings that the bar 2 may be swung out against the pressure of the springs 14 and about the upper ends of the fulcrum plates 4 without causing any distortion of the lugs 2 and 3 or breakage of the bar 4, and will return to proper position for operation on the stop switch 17.

While I have shown the attachment as connected to a dough breaking machine, it must be distinctly understood that the invention is not in any way limited to use on any particular machine. It is intended to be used on any kind of machine and apparatus in such position as may be necessary to adapt it for control by contact with any part of the body of the operator whose hands might be engaged or even caught in the machinery. It is also intended to be made of such dimensions and extend across a machine to adapt it for operation by anything thrown at it from a distance, in order to insure stopping of the machine when desired.

It is not necessary either that it be connected to a machine, since it is obvious that it may be mounted adjacent any kind of switch to be conveniently operated by contact with any part of the body of a person or by an object thrown at the bar 1 thereof from a distance.

What I claim is:

1. A dough breaking machine comprising frame work, a plurality of rollers rotatable about horizontal axes in said frame work, means for rotating said rollers, means for controlling the operation of said rotating means, guard means extending across said frame work substantially parallel with said axes for stopping said rotating means, means for rockably supporting said guard means and means for resiliently resisting the working of said guard in opposite directions.

2. A dough breaking machine comprising frame work, having rollers rotatable about substantially horizontal axes, means for rotating said rollers, a pair of fulcrum plates rockably mounted on and bearing against opposite sides of said frame work, resilient means bearing against said fulcrum plates, a bar connected to the free ends of said fulcrum plates, and stopping mechanism for said rotating means mounted in the path of movement of the said bar.

3. The combination with a support, of a switch mounted thereon, a pair of fulcrum plates rockably mounted and spaced apart on said support, means bearing against said plates on each side of their fulcrum points for holding same yieldingly in position on said support, and a bar connected to the free end of said fulcrum plates and adapted to be moved into contact with said switch to control the operation thereof.

4. The combination with a support, of a fulcrum plate having a point projecting from one side thereof and having apertures equidistantly spaced from said point, a pair of bolts passing through said apertures and adjustably connected to said support, coil springs interposed between the heads of said bolts and said fulcrum plate, a switch mounted on said support and adapted to be controlled by contact with one end of said fulcrum plate.

5. The combination with a support, of a pair of fulcrum plates spaced apart on said support, each plate having a fulcrum edge projecting from one side thereof, means for yieldingly pressing said plates on each side of their fulcrum edges to hold same in contact with said support, a bar connecting the ends of said fulcrum plates, and a switch mounted on said support in position to be operated by contact with said bar.

6. A support, a switch mounted thereon, a fulcrum plate rockably mounted on said support and having a part thereof extending over said switch, means for securing said plate yieldingly to said support and for adjusting said plate to hold said part at a predetermined distance from said switch.

7. A support, a switch mounted thereon, a fulcrum plate rockably mounted on said support and having one end bent to extend over said switch, said plate being provided with apertures on opposite sides of its fulcrum point, bolts passing through said apertures and screwthreaded into said support, and coil springs interposed between said plate and the heads of said bolts to control adjustment of said part relative to said switch, the coil spring intermediate the fulcrum point and the contact operating end of the plate being stronger than the other.

In testimony whereof I hereby affix my signature.

EDWIN S. WAGNER.